United States Patent [19]
Weder et al.

[11] Patent Number: 5,656,233
[45] Date of Patent: Aug. 12, 1997

[54] METHOD FOR MAKING LOW-DENSITY DECORATIVE GRASS

[75] Inventors: Donald E. Weder, Highland, Ill.; Marc A. Brockhaus, Norman, Okla.

[73] Assignee: Southpac Trust International, Inc., Oklahoma City, Okla.; not individually, but as trustee of The Family Trust U/T/A dated Dec. 8, 1995, Charles A. Codding, Authorized Signatory for Southpac Trust International, Inc. trustee

[21] Appl. No.: 473,478

[22] Filed: Jun. 7, 1995

[51] Int. Cl.$^6$ .............................. B29C 51/10; B65B 9/00
[52] U.S. Cl. .................. 264/553; 264/145; 264/146; 264/50; 53/450; 53/453
[58] Field of Search .................... 53/450, 452, 453; 264/50, 54, 146, 553, 145, 140, 321

[56] References Cited

U.S. PATENT DOCUMENTS

| | | | |
|---|---|---|---|
| 2,118,551 | 5/1938 | Doble | 53/578 X |
| 2,728,944 | 1/1956 | Crooks | 18/15 |
| 2,733,122 | 1/1956 | Herele et al. | 18/54 |
| 2,783,599 | 3/1957 | Weikert | 53/453 X |
| 2,836,941 | 6/1958 | Hultkrans et al. | 53/559 X |
| 2,949,713 | 8/1960 | Vogt | 53/579 X |
| 3,053,023 | 9/1962 | Watts | 53/453 X |
| 3,164,947 | 1/1965 | Gaston | 57/140 |
| 3,277,519 | 10/1966 | Jones | 18/1 |
| 3,336,174 | 8/1967 | Dyer et al. | 156/167 |
| 3,398,434 | 8/1968 | Alesi et al. | 425/395 X |
| 3,611,699 | 10/1971 | Wininger, Jr. et al. | 57/140 |
| 3,673,056 | 6/1972 | Nadler | 162/62 |
| 3,803,284 | 4/1974 | Burghardt et al. | 264/130 |
| 3,810,729 | 5/1974 | Patchell | 425/308 |
| 3,888,944 | 6/1975 | Crescentini et al. | 260/857 |
| 3,950,919 | 4/1976 | Perdue | 53/453 X |
| 3,965,655 | 6/1976 | Schooler et al. | 53/225 |
| 3,981,952 | 9/1976 | Ruddell et al. | 264/147 |
| 4,199,627 | 4/1980 | Weder et al. | 428/7 |
| 4,292,266 | 9/1981 | Weder et al. | 264/140 |
| 4,325,900 | 4/1982 | Holding et al. | 264/146 |
| 4,325,902 | 4/1982 | Holding | 264/146 |
| 4,776,521 | 10/1988 | Weder et al. | 241/30 |
| 4,893,757 | 1/1990 | Weder et al. | 241/34 |
| 5,015,430 | 5/1991 | Suzuki et al. | 264/146 |
| 5,081,819 | 1/1992 | Cloud | 53/453 |
| 5,484,562 | 1/1996 | Weder et al. | 264/554 X |
| 5,523,046 | 6/1996 | Weder et al. | 425/388 X |

FOREIGN PATENT DOCUMENTS

| | | | |
|---|---|---|---|
| 618951 | 3/1927 | France | 53/579 |
| 1486080 | 3/1969 | Germany | 53/453 |

*Primary Examiner*—Allan R. Kuhns
*Attorney, Agent, or Firm*—Dunlap & Codding, P.C.

[57] ABSTRACT

An apparatus and method for producing and bagging decorative grass, such as Easter grass. The apparatus includes an extruder, a godet, a slitter, a cutter, a bagging assembly and a programmable logic controller. The extruder produces a continuous sheet of material, which is fed by the godet into the slitter and cutter. A thickness gauge is provided between the extruder and slitter to measure the thickness of the sheet of material. The slitter has a row of blades which slit the sheet into a continuous length of slitted material. The cutter includes a rotatable blade which transversely cuts the slitted material into a number of individual filaments. The sheet of material is urged through the slitter and cutter by the godet and an air flow produced by a blower. A foaming agent is injected into the extruder to produce low-density decorative grass.

13 Claims, 9 Drawing Sheets

5,656,233

METHOD FOR MAKING LOW-DENSITY DECORATIVE GRASS

CROSS-REFERENCE TO RELATED APPLICATIONS

The present application is related to U.S. patent applications entitled "APPARATUS AND METHOD FOR MAKING AND BAGGING DECORATIVE GRASS", Ser. No. 08/485 959, and "EASTER GRASS BAG FORMING", Ser. No. 08/486,016, which were filed on even date herewith.

BACKGROUND OF THE INVENTION

1. Field of the Invention

The present invention relates to apparatus and methods for making decorative grass from sheet material and for separating out uniform charges of the decorative grass into bags or packages.

2. Description of Related Art

U.S. Pat. No. 4,292,266, issued to Weder et al., discloses a process for making decorative grass. Plastic strips are passed through a slow godet, a drawing oven and a high speed godet to enable the strips or strands to be drawn down in width and thickness without breaking. From the high speed godet, the strips or strands are chopped to a desired length and conveyed to a storage area.

The Weder '266 process does not segregate the decorative grass into uniform charges for bagging and packaging. The decorative grass is merely conveyed to a storage area.

U.S. Pat. No. 4,776,521, issued to Weder et al., discloses an apparatus and method for producing weighed charges of loosely aggregated filamentary material from compacted bales of the material. The apparatus includes a rotating drum which disintegrates bales of filamentary material into tufts of filaments. The tufts are passed to a picking chamber, where a toothed roll strips individual filaments from a supply roll formed from the tufts. The filaments are deposited on a scale until a charge of filaments is accumulated. Then air is blown across the scale to discharge the scale.

The Weder '521 apparatus does not make decorative grass from sheet material. Rather, the Weder '521 apparatus takes compacted bales of previously produced filamentary material, disintegrates the bales and weighs out charges of loose filaments.

SUMMARY OF THE INVENTION

The present invention is an apparatus and method for producing loose filaments from extruded sheet material and for immediate packaging of the filaments in uniform quantities. The apparatus includes an extruder, a godet, a slitter, a cutter and a bagging assembly.

The extruder provides a continuous length of sheet material to the godet, which feeds the sheet material to the slitter. The slitter makes a number of longitudinal cuts in the sheet material to define a plurality of continuous strips in the sheet of material. The strips are drawn into the cutter, where they are cut transversely to form individual filaments of decorative grass.

The individual filaments are transferred to the bagging assembly. A programmable logic controller is provided to monitor and control the speed of the godet, the cycles of the cutter and the operation of the bagging assembly to separate the filaments into uniform charges of decorative grass.

One object of the present invention is to provide an apparatus which produces decorative grass from sheet material and bags uniform charges of the decorative grass in a continuous operation.

Another object of the present invention is to provide an apparatus which requires no manual intervention from the extrusion of the sheet material through the bagging of the decorative grass.

Yet another object of the present invention is to provide an apparatus for separating decorative grass into uniform charges by weighing the grass or by counting the cycles of the cutter.

Other objects, features and advantages of the present invention are apparent from the following detailed description when read in conjunction with the accompanying drawings and appended claims.

DETAILED DESCRIPTION OF THE PREFERRED EMBODIMENTS

Figure 1:
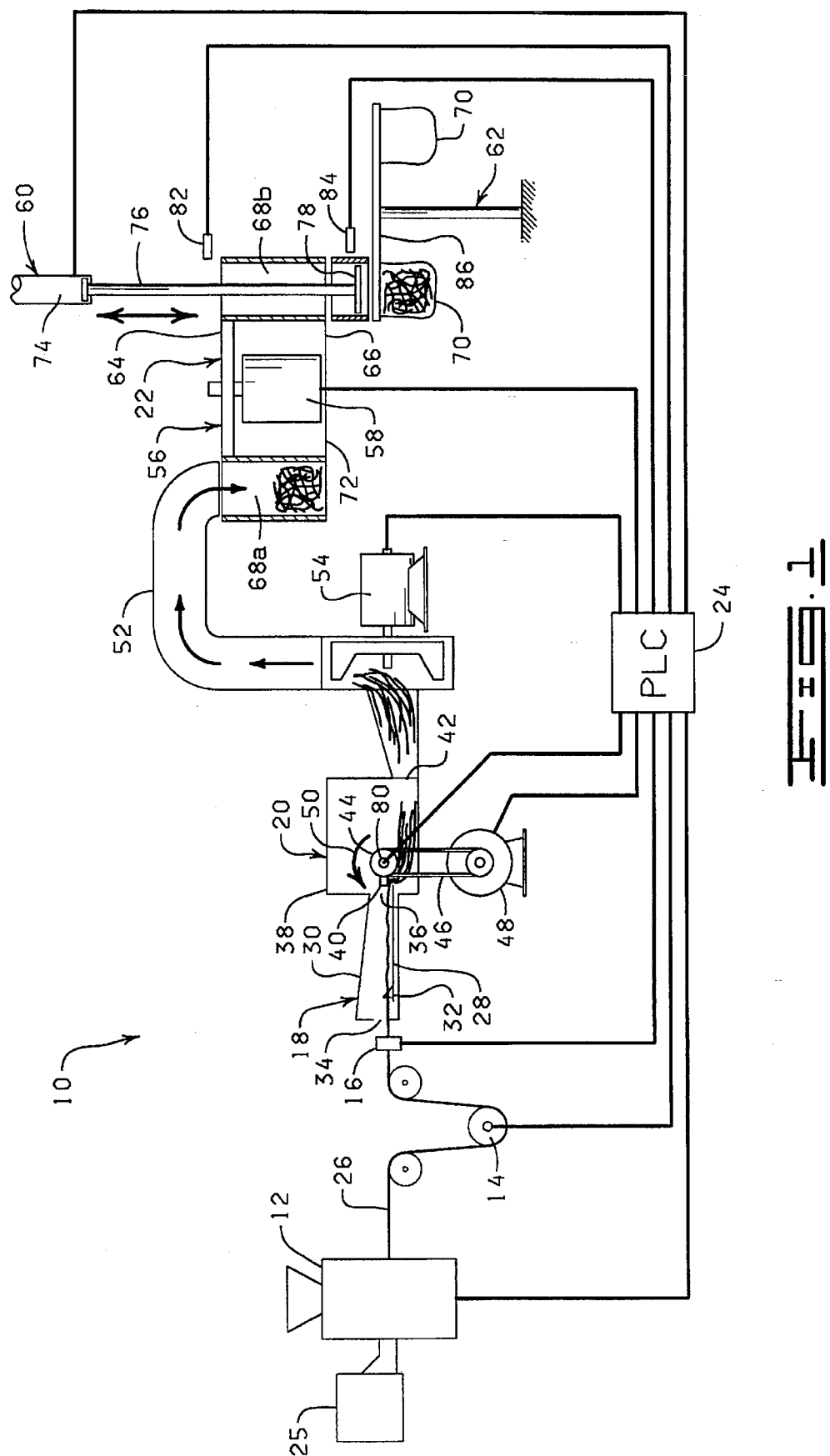
FIG. 1 is a schematic side elevational view of an apparatus for making and bagging decorative grass in accordance with the present invention.

Referring to the drawings in general, and to FIG. 1 in particular, shown therein and designated by the general reference numeral 10 is an apparatus for making and bagging decorative grass, which includes an extruder 12, a godet 14, a thickness gauge 16, a slitter 18, a cutter 20, a bagging assembly 22 and a programmable logic controller (PLC) 24.

The extruder 12 is any conventional machine which produces a web of sheet material from resins, colorants, additives, anti-static agents and flame retardants. A suitable extruder is disclosed in U.S. Pat. No. 4,292,266 issued Sep. 29, 1981 to Weder et al., which is hereby incorporated by reference.

Similarly, the godet 14 may be any known device for feeding sheet material from one location to another. A typical godet includes a plurality of rollers which are rotatable to dispense a continuous web of sheet material 26. In the present invention, the godet 14 receives the sheet material 26 from the extruder 12 and feeds it into the slitter 18.

Figure 2:
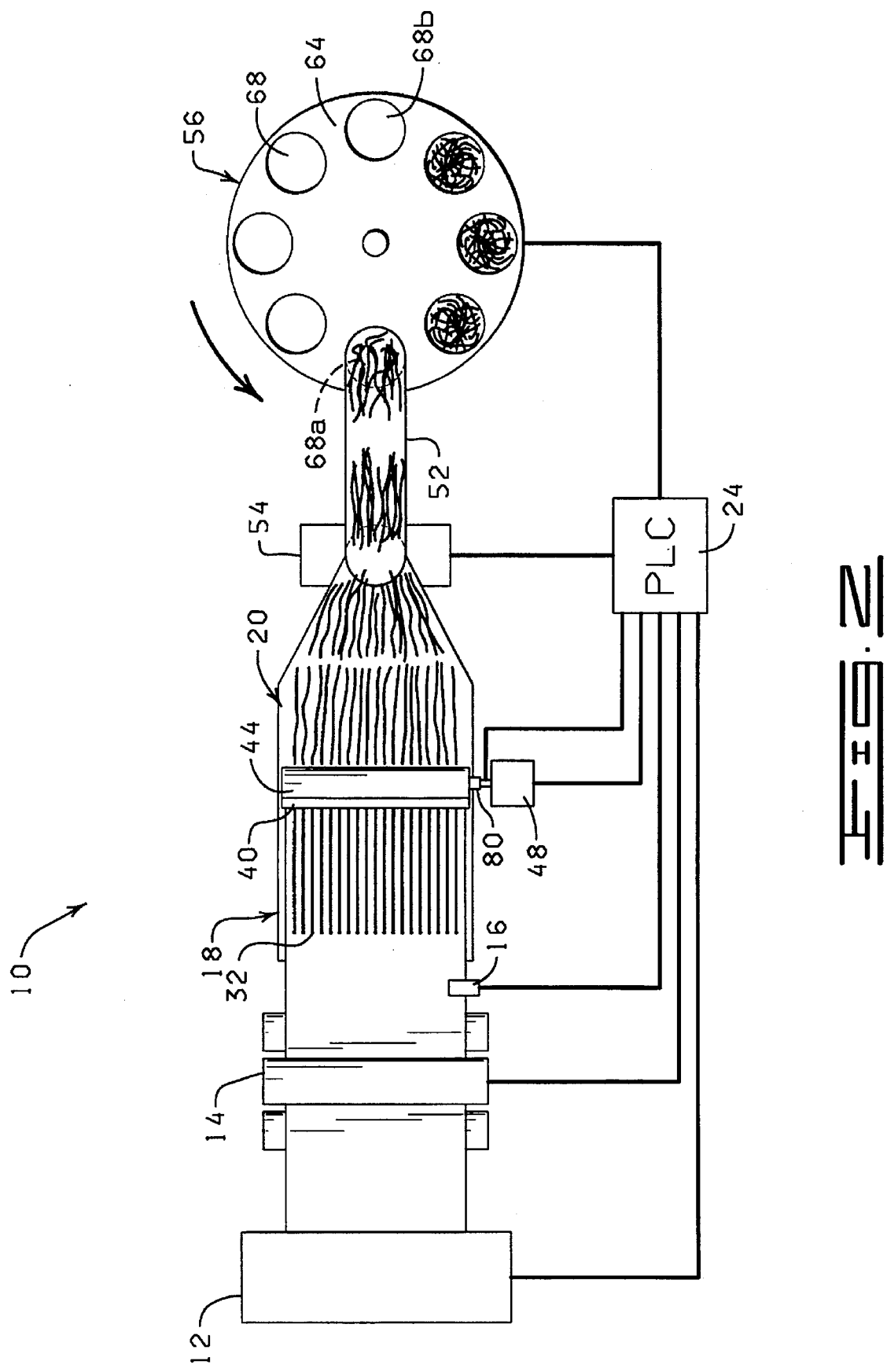
FIG. 2 is a schematic top view of a portion of the apparatus of FIG. 1.

The thickness gauge 16 is typically located between the godet 14 and the slitter 18 to measure the thickness of the sheet material 26. A suitable thickness gauge 16 may be selected from several instruments which are available from Measurex, Inc. in Cupertino, Calif. As shown in FIGS. 1 and 2, the thickness gauge 16 is operatively connected to the PLC 24 to provide measurements of the thickness of the sheet material 26 to the PLC 24.

The slitter 18 includes a slitter surface 28, a plurality of slitter blades and a slitter hood 30. One of the slitter blades is designated by reference numeral 32 and is generally representative of the slitter blades 32.

The slitter blades 32 protrude from the slitter surface 28 with cutting edges facing the incoming sheet material 26 to make a plurality of longitudinal cuts in the sheet material as the sheet material travels through the slitter 18. It should be appreciated that the slitter blades 32 are spaced across the slitter surface 28 at intervals to cut the sheet material into strips having the desired width for the decorative grass.

The slitter hood 30 extends angularly over the slitter surface 28 to define a slitter entrance 34 and a slitter exit 36. The slitter entrance 34, slitter exit 36 and slitter hood 30 are sized and shaped to enhance an air flow for drawing the sheet material 26 into the slitter entrance 34 and out of the slitter exit 36. That is, the air space between the slitter hood 30 and the sheet material 26 gradually decreases from the slitter entrance 34 to the slitter exit 36. This construction accelerates the air flow through the slitter 18 from the slitter entrance 34 to the slitter exit 36 to keep the slitted sheet material 26 substantially straight and moving smoothly through the slitter 18.

The cutter 20 includes a cutter housing 38 and a rotatable cutter blade 40. The cutter housing 38 communicates with the slitter exit 36 to receive slitted sheet material 26 into the cutter housing 38. The cutter housing 38 has a cutter exit 42 for the discharge of individual filaments comprising decorative grass.

Typically, the cutter blade 40 is attached to a cutter shaft 44, which is rotatably mounted within the cutter housing 38. A belt or chain 46 and cutter motor 48 are operatively connected to the cutter shaft 44 to rotate the cutter blade 40 as indicated by rotational arrow 50.

It should be appreciated that the cutter blade 40 extends across the width of the sheet material 26 to cut off a number of filaments from the slitted sheet material 26 with each revolution of the cutter blade 40. With a constant rate of travel of the sheet material 26 and a constant rate of revolution for the cutter blade 40, the filaments are cut from the slitted sheet material 26 in substantially uniform lengths.

A duct 52 communicates with the cutter exit 42 and extends to the bagging assembly 22. A blower 54 is provided to create an air flow for transferring filaments of decorative grass out of the cutter housing 38 to the bagging assembly 22.

It should be appreciated that the cutter exit 42 is located at a point lower than the cutter shaft 44 and the slitter exit 36. In this manner, the filaments cut from the slitted sheet material 26 are drawn by the blower 54 out of the cutter housing 38 without being struck by the revolving cutter blade 40.

The bagging assembly 22 includes a rotatable magazine turret 56, an index motor 58 for driving the rotation of the magazine turret 56, an inserter 60 and a bag handler 62. A suitable bagging assembly 22 is available from Prodo-Pak in Garfield, N.J.

As best seen in FIG. 2, the magazine turret 56 has a plurality of magazines extending from top 64 to bottom 66 through the magazine turret 56. One of the magazines is designated by reference numeral 68 and is generally representative of the magazines of the magazine turret 56.

Another one of the magazines, designated by reference character 68a, is in the fill position. Until rotated out of the fill position, the magazine 68a communicates with the duct 52 to receive filaments of decorative grass.

Yet another one of the magazines, designated by reference character 68b, is in the discharge position. The magazine 68b is located over a bag 70 for deposit of the filaments of decorative grass of the magazine 68b into the bag 70.

A stationary plate 72 is located at the bottom 66 of the magazine turret 56 to cover the lower end of the magazines 68 which are waiting to be discharged into bags 70. Thus, the stationary plate 72 keeps the filaments from falling out of the magazines 68 during filling, and after filling, until the discharge position is reached. Alternatively, the stationary plate 72 may be sized and shaped to cover the entire bottom 66 of the magazine turret 56 except for the discharge position.

The index motor 58 is adapted to rotate the magazine turret 56 to locate the magazines 68, one at a time, into the fill position. The magazine turret 56 is rotated by the index motor 58 such that the magazines 68 advance from position to position in step-wise fashion.

As illustrated by FIG. 2, the magazine turret 56 typically has eight magazines 68. While one of the magazines 68a is being filled with decorative grass, another of the magazines 68b is in the discharge position, three of the magazines are already filled and await rotation into the discharge position, and three of the magazines are empty and await rotation into the fill position. Although the magazine turret 56 typically has eight magazines 68, it should be appreciated that the magazine turret 56 may have any number of magazines consistent with the scope and purpose of the present invention.

The inserter 60 comprises a pneumatic cylinder 74 having a piston 76 which is extendable through the discharge magazines 68b. A push plate 78 is attached to the end of the piston 76 to force decorative grass out of the discharge magazine 68b and into the bag 70 as the piston 76 is extended. Of course, the piston 76 and push plate 78 must be retractable from the discharge magazine 68b in order for the magazine turret 56 to rotate when required.

It should be appreciated that a hydraulic or electric cylinder or any like device may be employed in place of the pneumatic cylinder 74. In an alternate embodiment, a blast of air, gases or gases containing an anti-static agent may be used to force the decorative grass from the magazines instead of a cylinder and piston.

The PLC 24 is operatively connected to the various components of the apparatus 10. In particular, the PLC 24 is connected to the extruder 12 and the godet 14 to monitor and control the rate at which the sheet material 26 is fed to the slitter 18 and cutter 20. Further, the PLC 24 is programmed to receive as input the width, thickness and density of sheet material 26 produced by the extruder 12.

In addition, the PLC 24 is operatively connected to the cutter motor 48 to monitor and control the speed of the cutter motor 48 and, in turn, the r.p.m.'s of the cutter blade 40. Further, the PLC 24 may be connected to any conventional mechanical or electronic device 80 for sensing and counting the number of revolutions of the cutter blade 40. Such devices are well known in the art and any one of a number of suitable components may be used.

As shown in FIG. 1, the PLC 24 may be operatively connected to the air blower 54, the index motor 58 and the inserter 60. Conventional devices and connections are provided to allow the PLC 24 to monitor and control the air flow rate produced by the air blower 54. The PLC 24 is connected to the index motor 58 to actuate the index motor 58 for rotating the magazine turret 56 to advance the magazines 68.

The PLC 24 is connected to the inserter 60 to actuate the extension and retraction of the piston 76 and push plate 78. An upper limit switch 82 is provided and connected to the PLC 24 to indicate to the PLC 24 when the piston 76 and push plate 78 are fully retracted from the discharge magazine 68b of the magazine turret 56. Further, a lower limit switch 84 is provided and connected to the PLC 24 to indicate to the PLC 24 when the push plate 78 is fully extended through the discharge magazine 68b of the magazine turret 56.

The bag handler 62 is provided for disposing an open bag beneath the discharge magazine 68b. The bag handler 62 may comprise two bag racks 86 which are alternately rotated under the discharge magazine 68b. In this manner, one bag rack 86 supports a bag being filled with decorative grass while a filled bag is removed from the other bag rack 86 and replaced with an empty bag. It should be appreciated that the bag handler 62 may be operated manually or may be a part of a conventional automated bag handling system (not shown).

Operation

Figure 3:
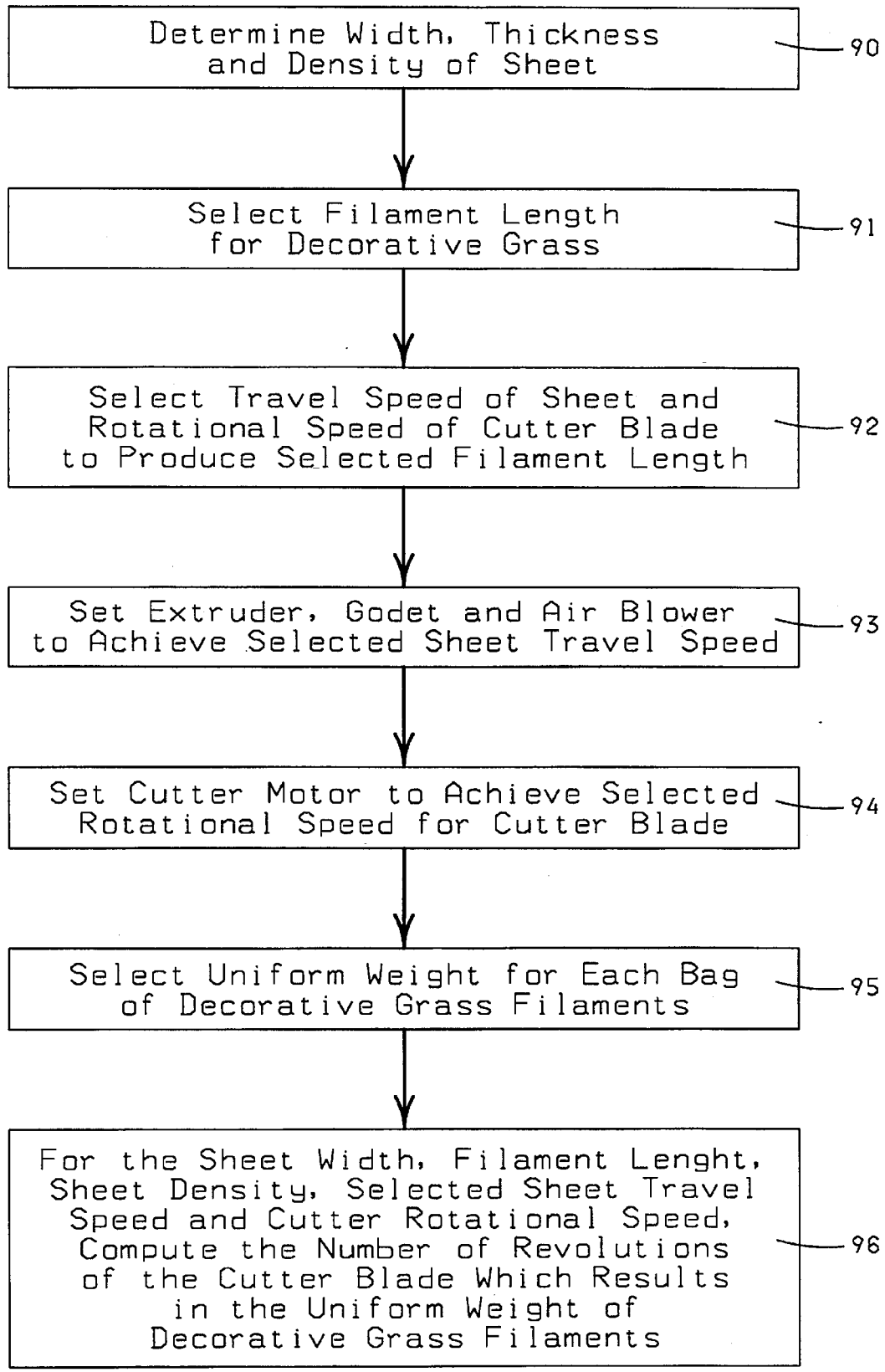
FIG. 3 is a flow diagram of set-up steps for a method of making and bagging decorative grass in accordance with the present invention.

With reference to FIG. 3, shown therein are the steps executed by the PLC 24 to set up the apparatus 10 for operation. First, the extruder 12 is set to produce sheet material 26 having a known width and density. The sheet width And sheet density are input to the PLC 24. This may be done manually or by any conventional connection between the extruder 12 and the PLC As the sheet material 26 is advanced by the godet 14, the thickness gauge 16 measures the thickness of the sheet material 26. The sheet thickness is automatically communicated from the thickness gauge 16 to the PLC 24 (FIG. 3, Block 90). Thus, the sheet width, sheet density and sheet thickness are known quantities to the PLC 24.

Then, a length for the filaments comprising the decorative grass product is selected (Block 91). A travel speed for the sheet material 26 and a rotational speed for the cutter blade 40 are selected to produce filaments of decorative grass having the selected filament length.

It should be appreciated that the width of the filaments is determined by the spacing of the slitter blades 32. It may be desirable that the slitter blades 32 be removably mounted to the slitter surface 28. In this way, slitter blades 32 with different spacings may be mounted to the slitter surface 28 in order to produce filaments in a wide variety of widths.

The production speed of the extruder 12, godet 14 and the air blower 54 are adjusted by the logic of the PLC 24 to achieve the selected travel speed of the sheet material 26 through the slitter 18 and cutter 20. Further, the cutter motor 48 is set such that the cutter blade 40 has the rotational speed to produce filaments having the selected filament length for the selected travel speed of the sheet material 26 (Block 92).

Utilizing the selected production speeds, sheet width, sheet density, and sheet thickness measured by the thickness gauge 16, the program logic of the PLC 24 computes how many revolutions of the cutter blade 40 are required in order to result in the desired uniform weight of grass to be placed in each bag (Block 96). This computation of cutter blade 40 revolutions is used by the PLC 24 to control the operation of the bagging assembly 22.

Figure 4:
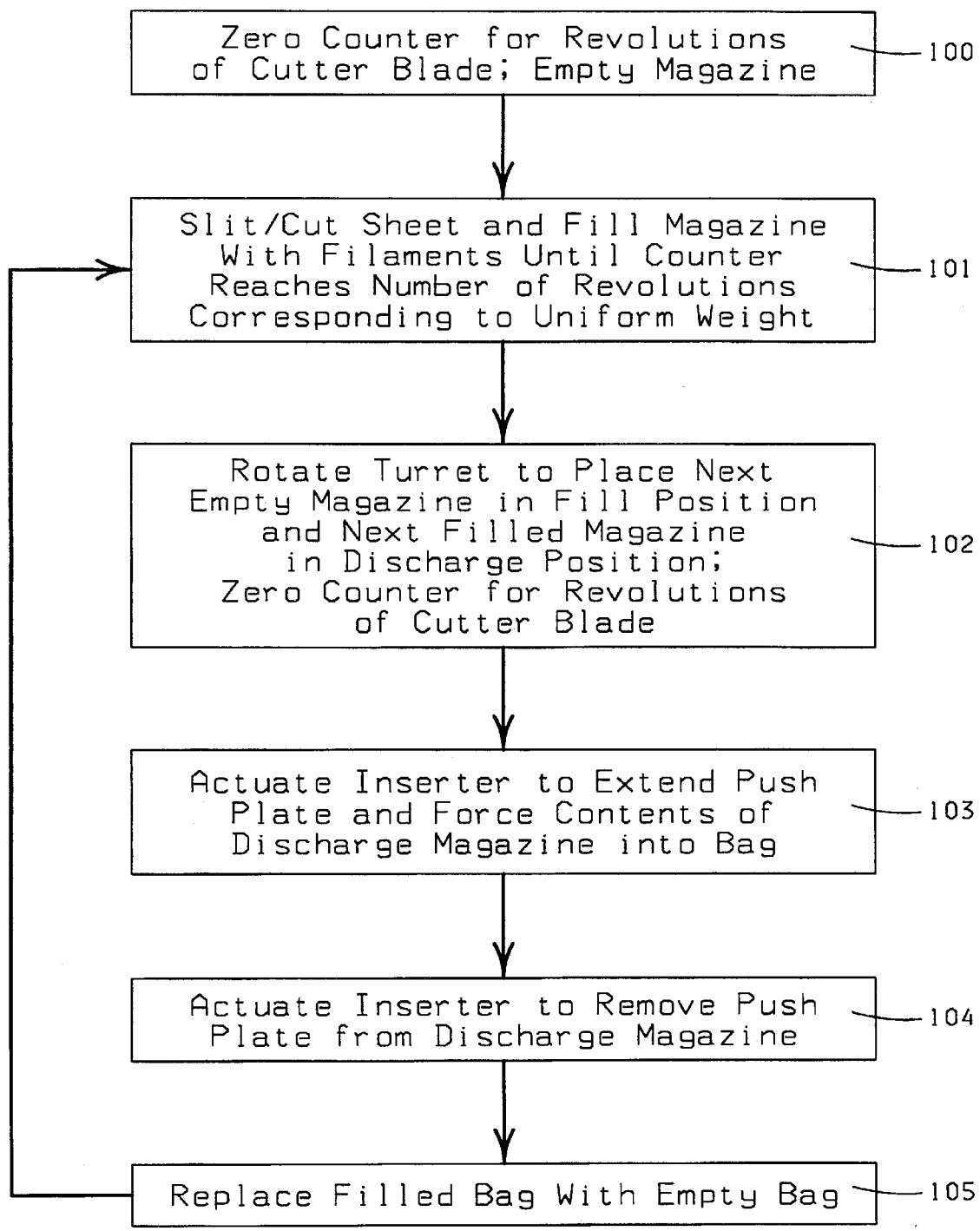
FIG. 4 is a flow diagram of production steps for a method of making and bagging decorative grass in accordance with the present invention.

As illustrated by FIG. 4, the production and bagging of decorative grass is begun by zeroing the count of cutter blade 40 revolutions and rotating an empty magazine 68 into the fill position (Block 100). Then the sheet material 26 is slit, cut and blown into the magazine 68a until the computed number of revolutions of the cutter blade 40 is reached (Block 101).

When the computed number of revolutions of the cutter blade 40 is reached, the PLC 24 causes the index motor 58 to rotate the magazine turret 56 such that the next magazine 68 is situated in the fill position (Block 102). The count of cutter blade 40 revolutions is reset to zero. As soon as the next magazine 68 is advanced into the fill position, it begins to receive decorative grass from the duct 52.

Rotation of the magazine turret 56 also moves a filled magazine 68 into the discharge position (Block 102). As soon as the rotation of the magazine turret 56 is complete, the PLC 24 actuates the inserter 60 to force the contents of the discharge magazine 68b into the bag 70 disposed at the discharge magazine 68b (Blocks 103 and 104).

Limit switches 82 and 84 sense when the push plate 78 of the inserter 60 is fully extended through the discharge magazine 68b and fully withdrawn from the discharge magazine 68b. The PLC 24 should also have logic to prevent rotation of the magazine turret 56 unless the push plate 78 is completely withdrawn from the discharge magazine 68b.

After being filled, the bag is moved from the discharge magazine 68b and an empty bag is placed into position for receiving grass during the next discharge cycle (Block 105). Typically, the filled bags are sealed, labeled and packaged for shipment to points of distribution and sale.

As soon as each discharge cycle is initiated, the PLC 24 zeroes the counter for the revolutions of the cutter blade 40 and the fill-and-discharge procedure is repeated. By utilizing the calculations of the PLC 24 and the counter device 80, scales for weighing out uniform quantities of decorative grass are eliminated.

By obviating the need for scales, the present invention simplifies the task of uniformly bagging decorative grass. Further, the present invention allows the production and bagging of decorative grass in a single, continuous operation.

The present invention may be modified in a wide variety of ways. For example, the thickness of the sheet material from the extruder 12 may be assumed to be substantially constant. In such a case, the thickness gauge 16 may be replaced by any known device for measuring the length of sheet material passing by the device. The PLC 24 may control the components of the system according to the lengths measured by the device rather than by the density and travel speed of the sheet material and the revolutions of the cutter blade 40.

As another example, the thickness and travel speed of the sheet material may be assumed to be substantially constant.

In this instance, any conventional timing device may be used in place of the thickness gauge 16 and the revolution counter device 80. The PLC 24 may control the components of the system according time intervals corresponding to the density, dimensions and travel speed of the sheet material.

Bag Formation

Figure 5:
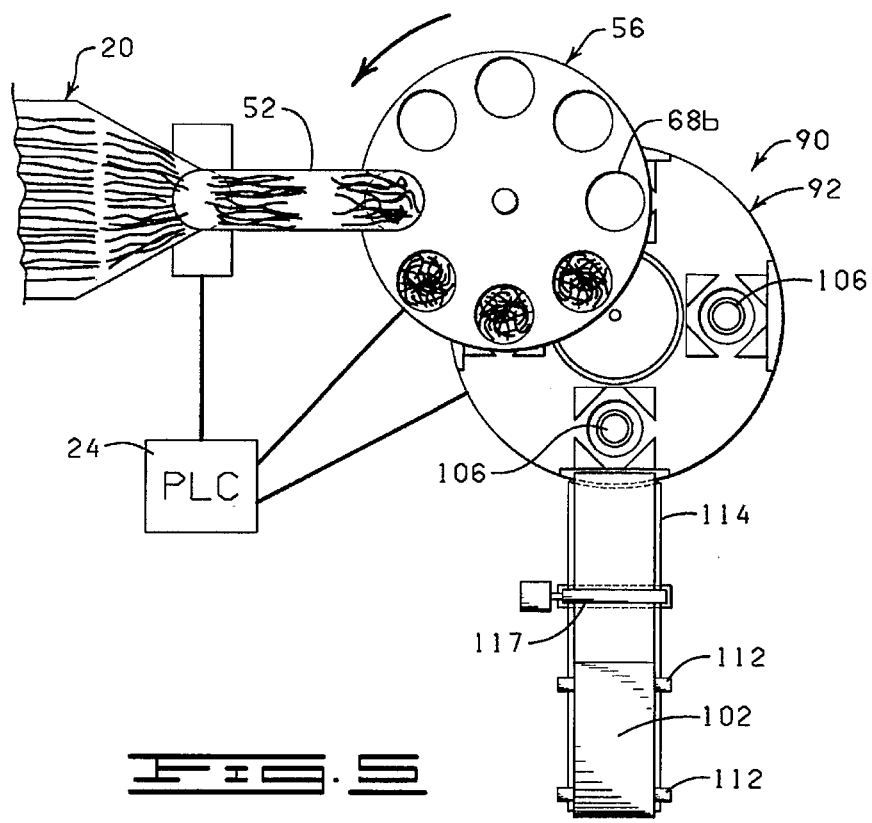
FIG. 5 is a partly diagrammatical top view of a bagging portion of a preferred embodiment of the apparatus. In this particular embodiment, bags are formed from sheet material.

With reference to FIGS. 5 through 9, shown therein and designated by reference character 90 is a preferred embodiment of a bagging system which forms bags from sheet material. The bagging system 90 comprises a mold turret 92, an a.c. power source 94, a vacuum source 96, a motor 98, a heat source 100, a roll of sheet material 102 and a sheet cutter 104. As shown in FIG. 5, the PLC 24 is connected to the bagging system 90 to control and coordinate its functions according to the sequence of operations disclosed hereinbelow.

The mold turret 92 includes a plurality of bagging molds 106 and is rotatable by the motor 98. Further, the mold turret 92 is arranged such that the bagging molds 106 are successively positioned at the discharge end of the discharge magazine 68b position as the mold turret 92 is rotated.

Figure 6:
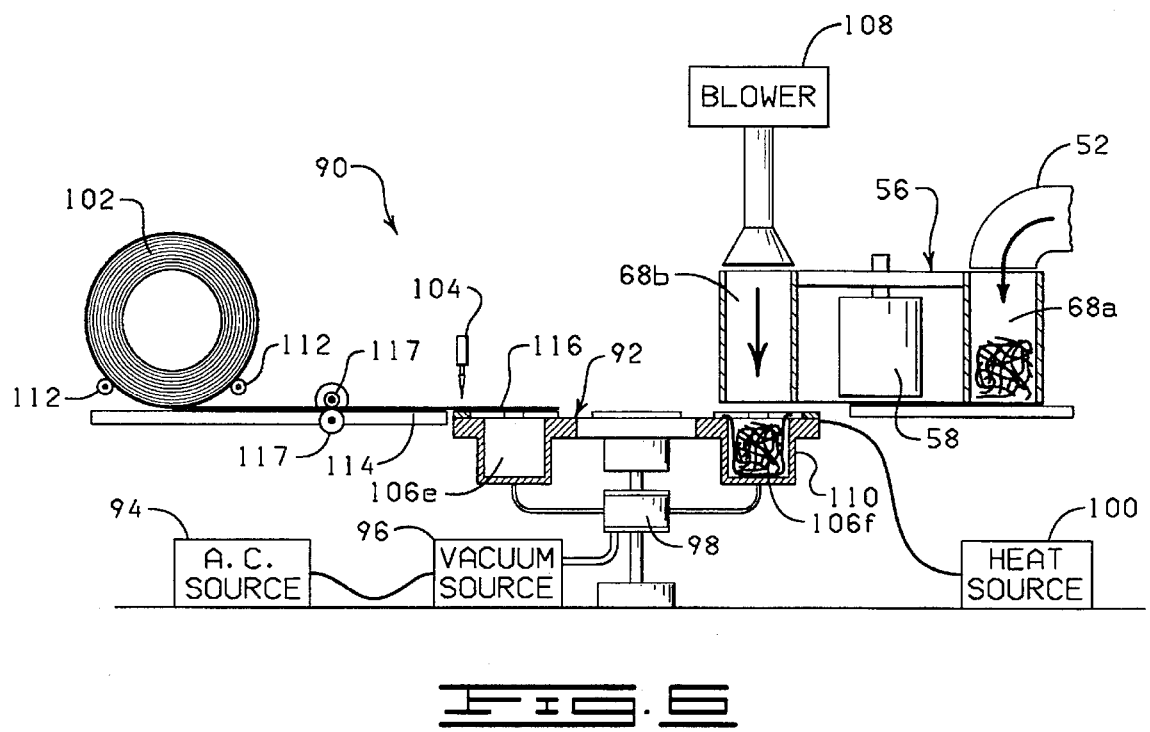
FIG. 6 is a partly diagrammatical side view of the bagging portion shown in FIG. 5.

As shown in FIG. 6, a blower 108 may be provided to urge the decorative grass from the discharge magazine 68b into a receiving bag 110. However, the bagging system 90 may have the inserter 60 instead of the blower 108 (FIG. 1) for urging the grass into the bag 110.

A pair of rollers 112 are provided to support the roll 102 of sheet material over a substantially flat feed surface 114. The rollers 112 are adapted to successively feed end portions 116 of the sheet material to a position over an empty bag mold 106e.

A pair of feed rollers 117 are rotatably mounted to feed sheet material therebetween along the sheet feed surface 114. The sheet cutter 104 is mounted over the sheet material for successively cutting end portions 116 from the continuous length of sheet material.

Figure 7:
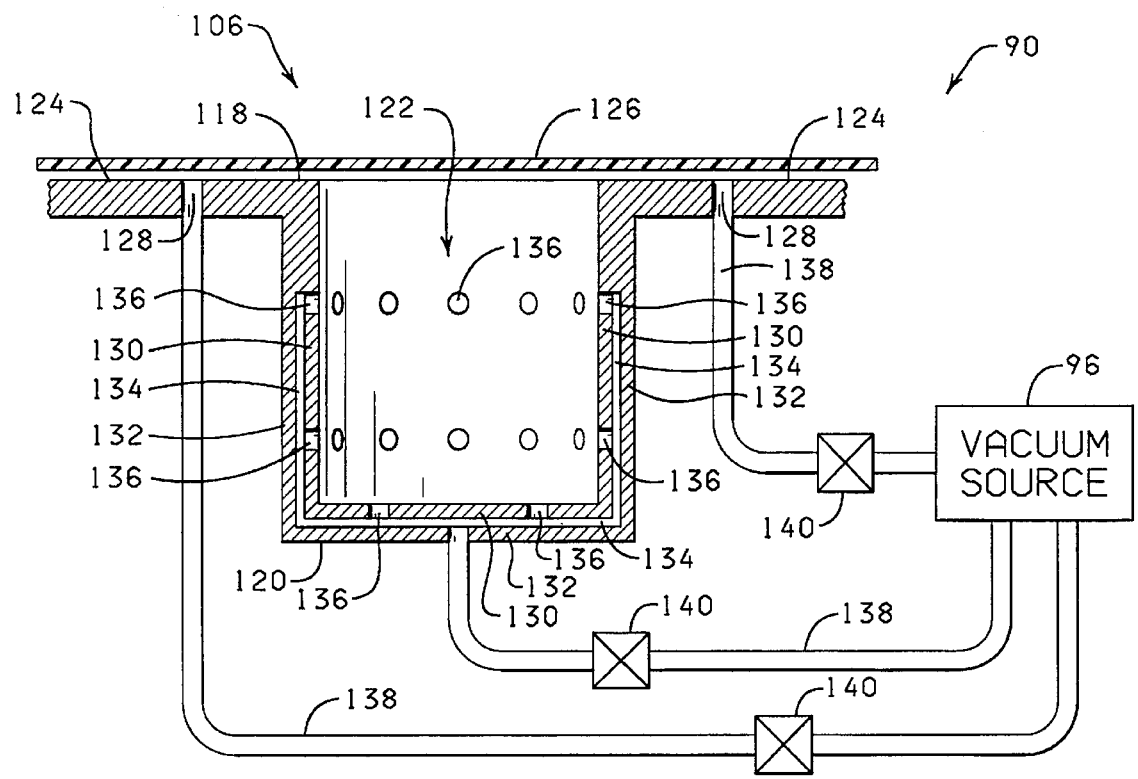
FIG. 7 is a partly sectional, partly diagrammatical view of one of the bagging molds shown in FIGS. 5 and 6. A sheet of material is shown before being formed into a bag.
Figure 8:
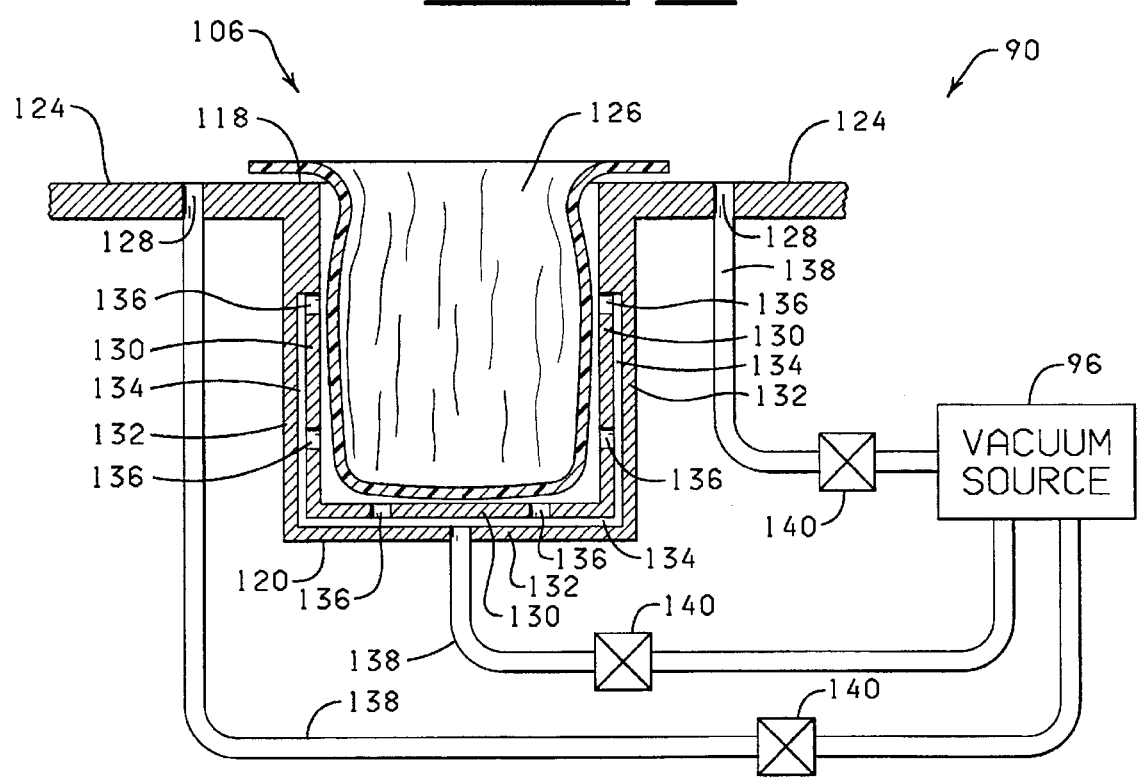
FIG. 8 is the same view as FIG. 7 except that the sheet of material is shown after being formed into a bag.
Figure 9:
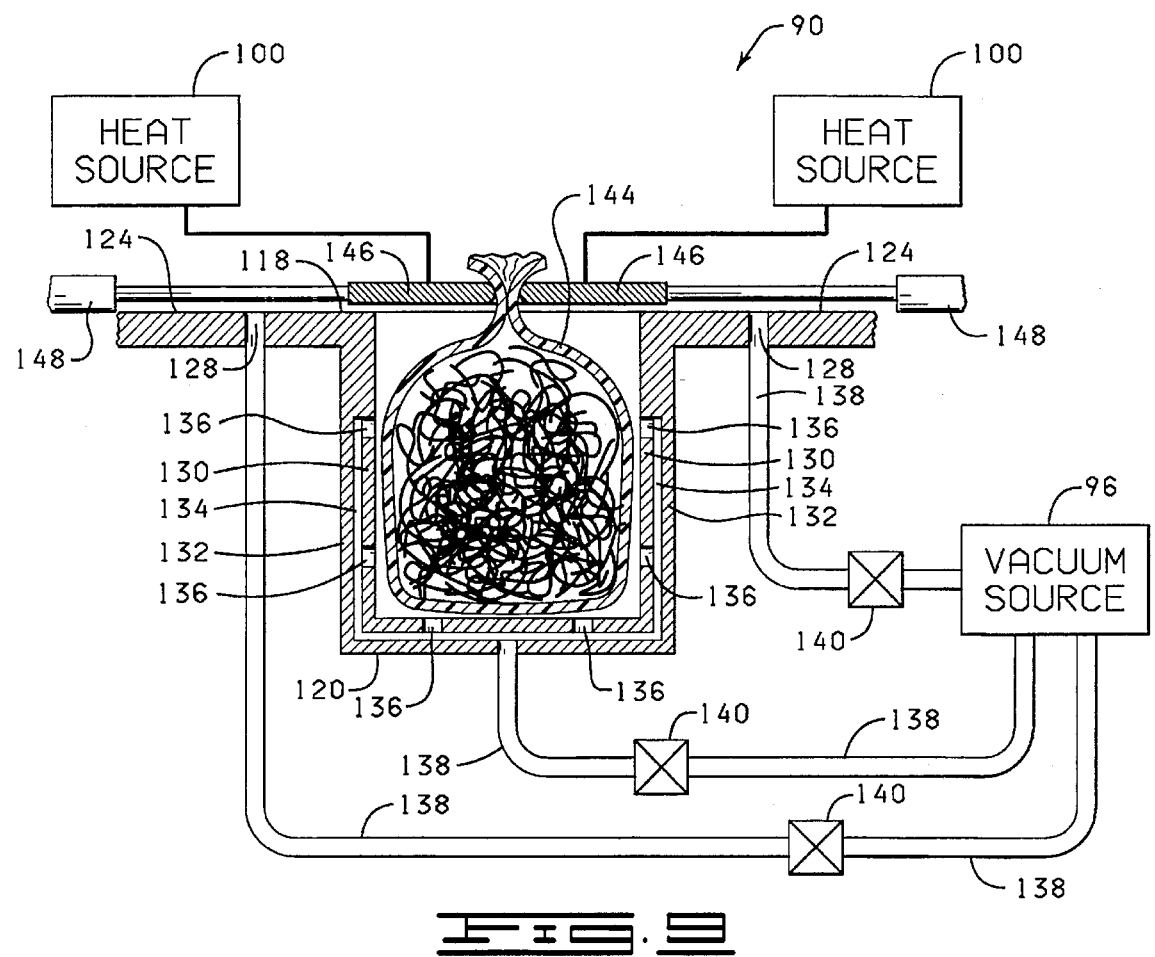
FIG. 9 is the same view as FIG. 8 except that the bag is filled with decorative grass and is closed and sealed.

With reference to FIGS. 7 through 9, shown therein is one of the bagging molds 106 in detail. Typically, each bagging mold 106 is generally cylindrical. However, it should be appreciated that the bagging molds 106 may be constructed in a wide variety of shapes.

Each bagging mold 106 has a first end 118, a second end 120 and a mold opening 122 extending from the first end 118 toward the second end 120. Around the first end 118, a substantially flat holding surface 124 is provided to support a sheet 126 cut from the end portion 116 of the roll 102 of sheet material.

The holding surface 124 has a plurality of vacuum holes 128 for maintaining the cut sheet 126 in place by means of a vacuum. Further, a lower portion of the side walls and all of the bottom walls of each bagging mold 106 have an inner wall 130 and an outer wall 132. The inner walls 130 and outer walls 132 are spaced apart to define a vacuum annulus 134.

The inner wall 130 is provided with a plurality of inner vacuum holes which communicate with the mold opening 122 and the vacuum annulus 134. Several of the inner vacuum holes are designated by reference numeral 136 and are generally representative of the interior vacuum holes.

Vacuum lines 138 are provided to connect the vacuum holes 128 and 136 to the vacuum source 96. A vacuum valve 140 is located in each vacuum line 138 to control the amount of vacuum applied to the vacuum holes 128 and 136.

In operation, the end portion 116 of the sheet material 102 is fed over the empty bagging mold 106e. Vacuum is applied to the vacuum holes 128 in the holding surface 124 of the empty bagging mold 106e. Then the sheet cutter 104 is actuated to cut the end portion 116 from the sheet material 102 (FIGS. 6 and 7).

The vacuum on the vacuum holes 128 in the holding surface 124 is reduced or cut off as the vacuum on the inner vacuum holes 136 is increased or turned on. This action draws the end portion 116, which is now a cut sheet 126 of material into the mold opening 122 of the bagging mold 106e to form a bag 144 (FIG. 8).

The cutting and bag forming may be performed at the same rotational position of the mold turret 92. Alternatively, the cutting may be done at one position and the bag forming may take place at any other rotational position before the bag filling position.

The mold turret 92 is rotated to place the formed, empty bag in the bag filling position. The blower 108 produces an air flow to force the decorative grass from the magazine of the magazine turret 56 and into the bag 144 (FIGS. 6 and 9).

The filled bag 144 may then be closed and sealed in any conventional manner, such as with a twist tie, closure tag, adhesive strip or the like. As shown in FIG. 9, a plurality of closure blocks 146 moveable by closure cylinders 148 may be provided to close the filled bag 144.

Alternatively, the sheet of material may comprise any conventional adhesive or cohesive substance to seal the bag closed upon contact with itself. In another preferred embodiment, the sheet material may comprise any conventional heat-sealable substance and the heat source 100 may be connected to each closure block 146 to effect heat-sealed closure of each bag 144 (FIG. 9).

Embodiment of FIGS. 10 through 13

Referring to FIGS. 10 through 13, shown therein and designated by reference numeral 150 is a preferred embodiment of a bunny mold. The bunny mold 150 is constructed to form the sheet 126 of material into a bag in the shape of an Easter bunny.

The bunny mold 150 is a split mold having two ear halves 152 and two body halves 154. An ear cylinder 156 is connected to each ear half 152 to move the ear halves 152 between an open and a closed position. Similarly, a body cylinder 158 is attached to each body half 154 to move the body halves 154 between an open and a closed position.

Each one of the ear halves 152 and the body halves 154 have inner walls 160 and outer walls 162 separated by a vacuum annulus 164. The inner walls have a plurality of vacuum holes 166 communicating with the vacuum annulus 164. Vacuum lines 138 and vacuum valves 140 are provided to connect the vacuum annulus 164 of each ear half 152 and each body half 154 to the vacuum source 96.

A substantially flat holding surface 172 with a plurality of vacuum holes 174 is provided above the ear halves 152 to support the sheet 126 of material. The holding surface 172 has an opening 176 therethrough to allow the sheet 126 of material to be drawn by vacuum into the interior of the bunny mold 150.

Figure 10:
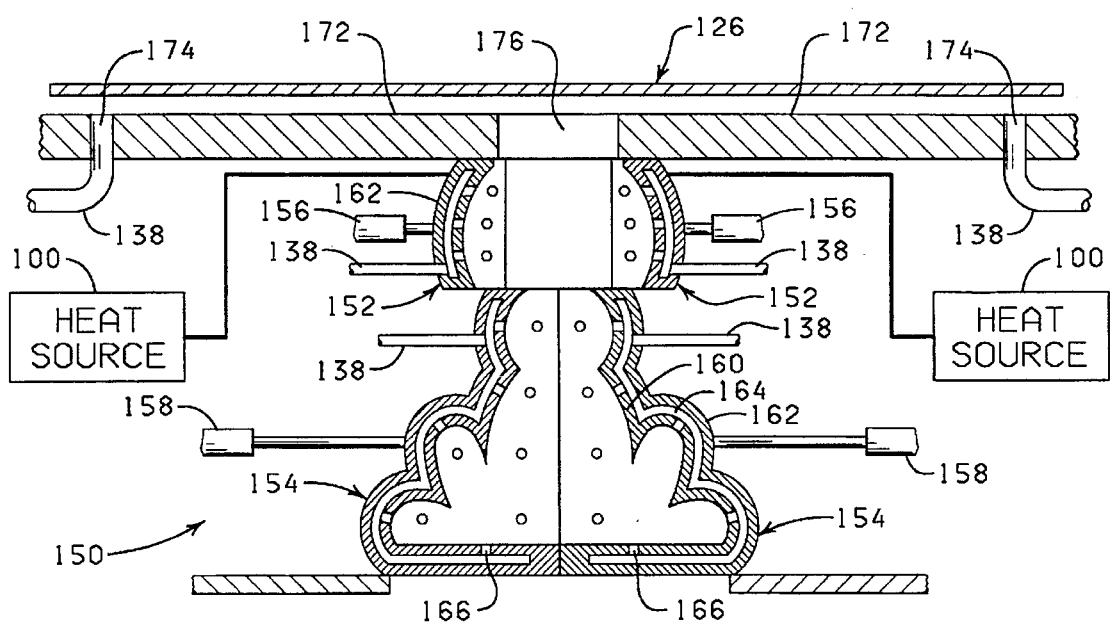
FIG. 10 is a partly sectional, partly diagrammatical view of another preferred embodiment of a bagging mold. This bagging mold forms a sheet of material into a bag shaped like an Easter bunny. The sheet of material is shown before being formed into a bag.

In operation, the ear halves 152 are moved to the open position and the body halves 154 are moved to the closed position. At this time, the sheet 126 of material is held by vacuum through the vacuum holes 166 of the holding surface 172 (FIG. 10). For clarity of illustration, the vacuum source 96, the vacuum valves 140 and portions of the vacuum lines 138 are not shown in FIG. 10.

Figure 11:
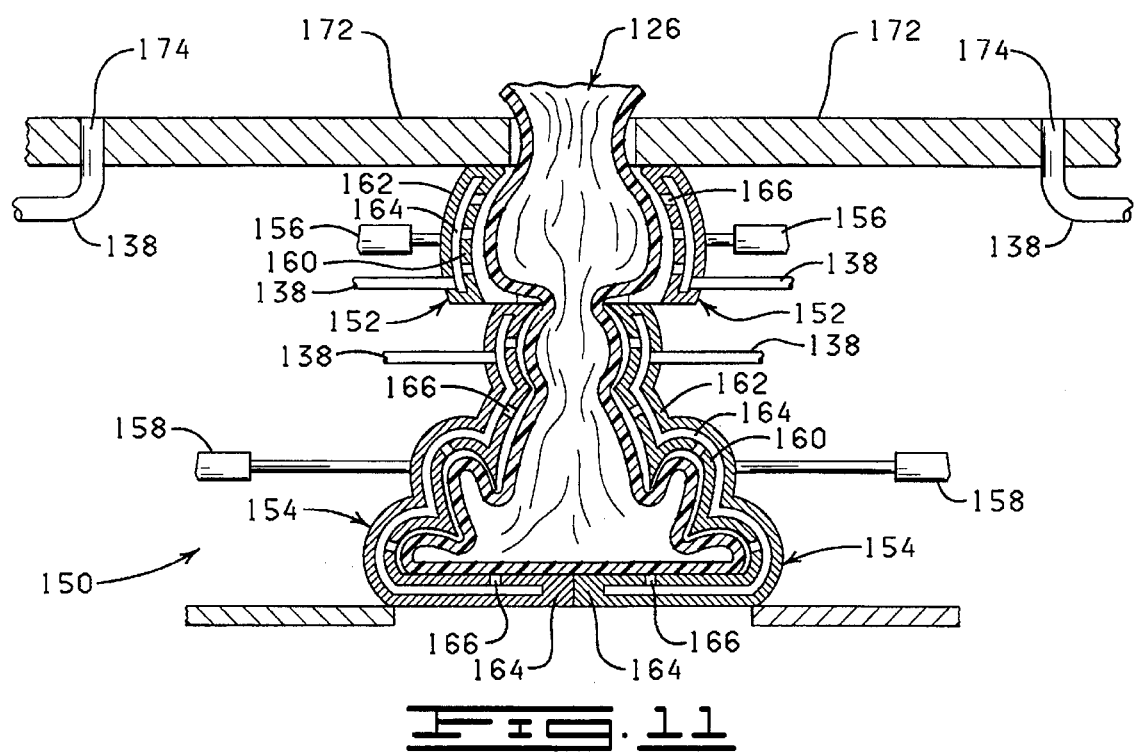
FIG. 11 is the same view as FIG. 10 except that the sheet of material is shown after being formed into a bag.

Next, the vacuum on the vacuum holes 174 in the holding surface 172 is reduced or cut off as the vacuum on the inner vacuum holes 166 is increased or turned on. This action draws the sheet 126 of material through the opening 176 of the holding surface 172 and into the bunny mold 150 (FIG. 11). For clarity of illustration, the heat source 100, the vacuum source 96, the vacuum valves 140 and portions of the vacuum lines are not shown in FIGS. 11 through 13. It should be appreciated that the sheet 126 of material should be sufficiently flexible to be drawn against the inner walls 160 within the bunny mold 150 by the vacuum.

Figure 12:
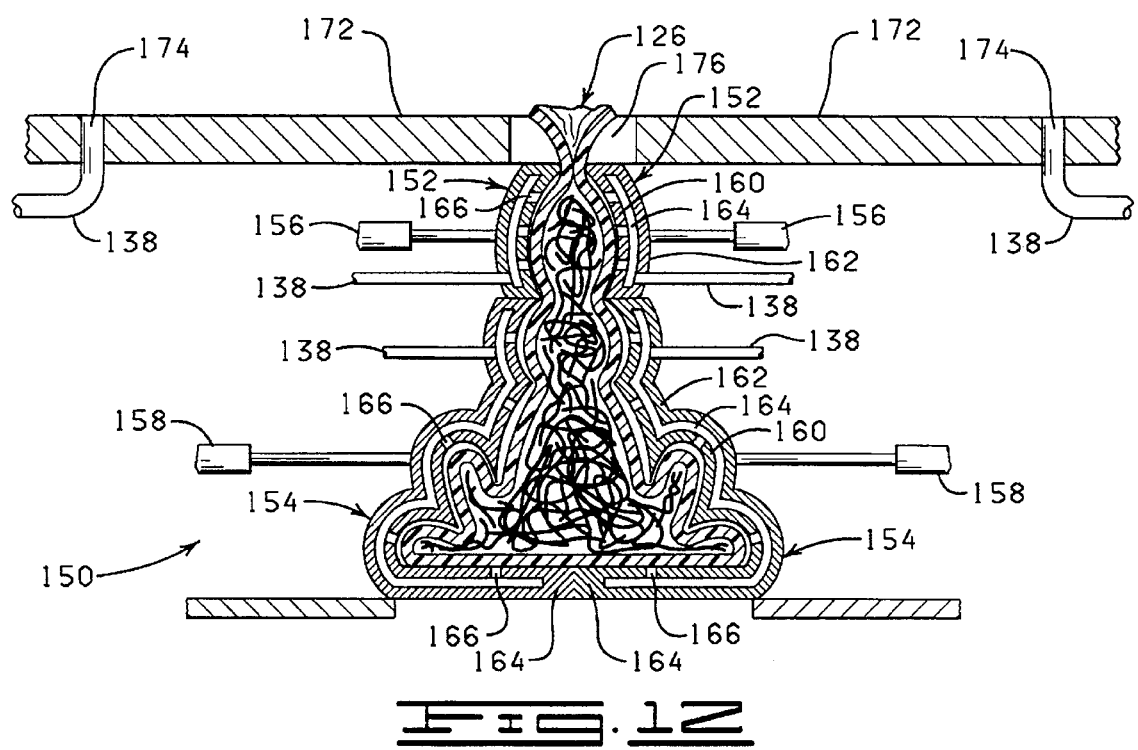
FIG. 12 is the same view as FIG. 11 except that the bag is filled with Easter grass and is closed and sealed.

After the bag is filled with decorative grass, the ear halves 152 are closed to form the ears and to seal the bag (FIG. 12). The sheet 126 of material may comprise any conventional adhesive or cohesive substance, in which case the bag seals shut upon contact with itself.

In another preferred embodiment, the sheet 126 of material comprises a heat-sealable substance. In this case, heat is applied by heat sources 100 to an upper portion of each one of the ear halves 152 to effect a heat-sealed closure of the bag (FIGS. 10 and 12).

Figure 13:
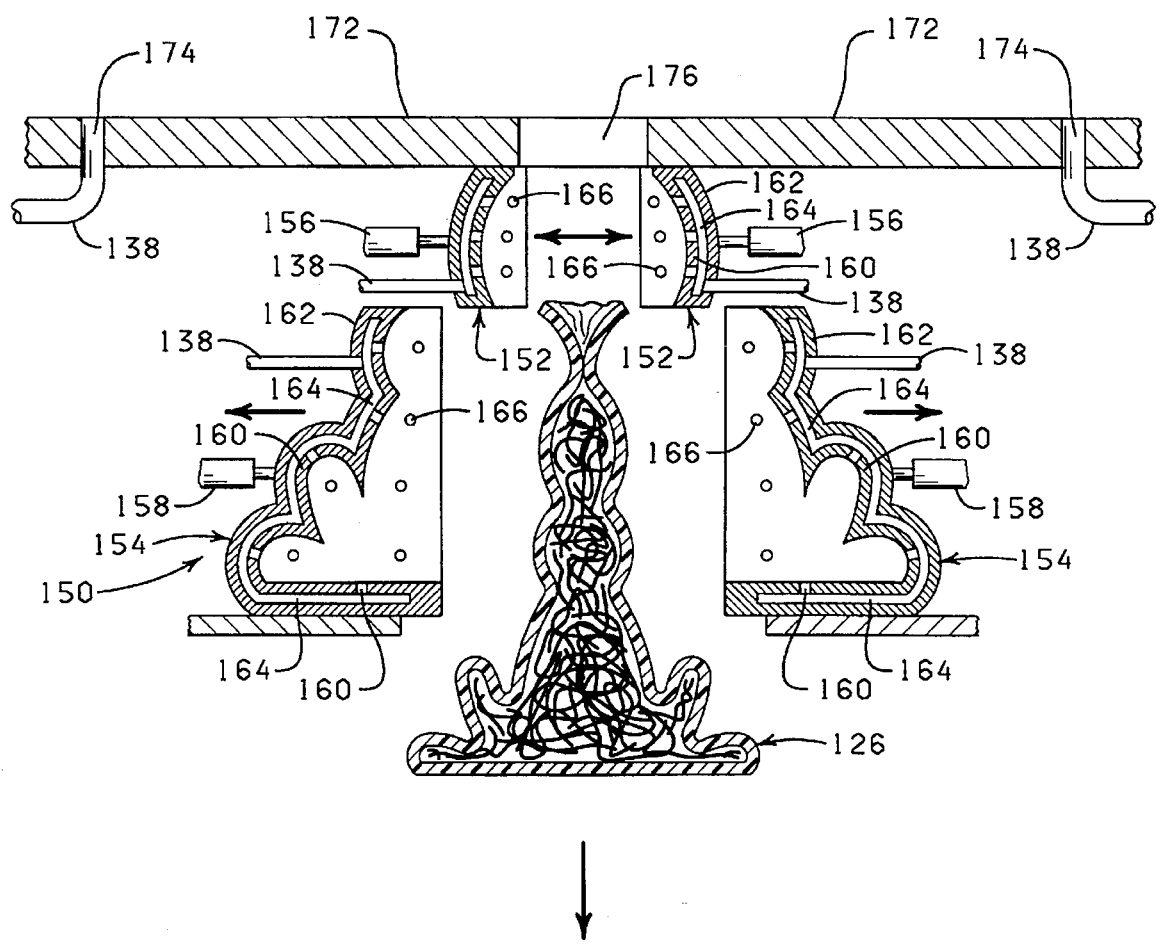
FIG. 13 is the same view as FIG. 12 except that the mold is open to release the filled bag of Easter grass.

Once the bag is sealed, both the ear halves 152 and the body halves 154 are opened to release the formed, filled and sealed bag (FIG. 13).

It should be appreciated that a wide variety of molds may be utilized in a manner similar to that disclosed herein. For example, molds for forming bags in the shape of chicks, ducks, any other animals or any inanimate object may be constructed within the scope and purpose of the present invention.

Low-Density Decorative Grass

Referring back to FIG. 1, the foam injector 25 is connected to the extruder 12 to inject a foaming agent or blowing agent into the material being extruded into sheet material. The foaming agent is provided to produce a sheet material having a low density.

The foaming agent may be air, nitrogen or any suitable gaseous mixture or compound. In this case, the foaming agent is injected into the extrusion mixture under pressure to create tiny gas bubbles in the extruded material.

In another preferred embodiment, the foaming agent is a compound or substance which is activated by heat to evolve a gas such as carbon dioxide. Examples of this type of foaming agent are baking powder, sodium bicarbonate, ammonium carbonate, pentane and hydrazine and related compounds.

In using one of the heat-activated foaming agent, pellets for the extrusion material, such as polystyrene pellets, and the foaming agent are introduced into the extruder 12. Heat is used to melt the pellets and with the heat the foaming agent evolves a gas into the material to reduce the density of the extruded material.

Other steps in the process of making decorative grass and in the construction of decorative grass are disclosed in U.S. Pat. Nos. 4,199,627 and 4,292,266, which are hereby incorporated by reference.

Changes may be made in the combinations, operations and arrangements of the various parts and elements described herein without departing from the spirit and scope of the invention as defined in the following claims.

What is claimed is:

1. A method for continuously producing and bagging reduced density filaments of material in uniform quantities, the method comprising:

a. providing a plurality of magazines selectively movable between a filament-receiving position and a filament-discharging position;

b. producing filaments of material having a reduced density at a predetermined rate;

c. transferring a substantially uniform quantity of filaments continuously into a magazine positioned in the filament-receiving position;

d. moving the magazine filled with the substantially uniform quantity of filaments to the filament-discharging position and another one of the magazines into the filament-receiving position at a rate corresponding to the predetermined rate that the filaments are being produced;

e. providing a mold positioned to communicate with the magazine positioned in the filament-discharging position, the mold having an open first end, a second end and a side wall cooperating to define a mold opening;

f. positioning a sheet of material capable of being formed into a bag adjacent the mold opening of the mold;

g. drawing the sheet of material into the mold opening of the mold so as to form the sheet of material into a bag wherein the bag is positioned to receive the substantially uniform quantity of filaments transferable from the magazine filled with the substantially uniform quantity of filaments and positioned in the filament-discharging position;

h. discharging filaments from the magazine filled with the substantially uniform quantity of filaments and positioned in the filament-discharging position so that the substantially uniform quantity of filaments are discharged into the bag;

i. removing the bag containing the substantially uniform quantity of filaments; and j. repeating steps b, c, d, e, f, g, h, i and j.

2. The method of claim 1 wherein at least one of the sidewall and second end of the mold further comprises:

at least one hole formed therethrough wherein the hole communicates with the mold opening of the mold; and wherein the step of drawing the sheet of material into the mold opening further comprises the step of:

applying a negative pressure to the hole formed in the mold whereby the negative pressure draws the sheet of material into the mold opening and forms the sheet of material into a bag.

3. The method of claim 1 wherein the step of producing filaments of material continuously further comprises the steps of:

providing a continuous sheet of material having a thickness, a width, a reduced density and a predetermined travel speed;

slitting the continuous sheet of material to produce continuous strands of material having a predetermined width; and cutting the continuous strands of material into filaments.

4. The method of claim 3 wherein the step of cutting the continuous strands of material further comprises the steps of:

providing a rotatable blade; and rotating the rotatable blade at a predetermined rotational rate corresponding to the travel speed of the continuous sheet of material so that filaments are produced having a predetermined length.

5. The method of claim 4 wherein the method further comprises the steps of:

determining the predetermined travel speed of the continuous sheet of material and the predetermined rotational rate of the rotatable blade; and adjusting the travel speed of the continuous sheet of material and the rotational rate of the rotatable blade to produce filaments at a predetermined rate.

6. The method of claim 4 wherein the step of moving the magazines further comprises the step of:

counting the revolutions of the rotatable blade wherein the magazines are selectively moved between the filament-receiving position and the filament-discharging position based on a predetermined number of revolutions of the rotatable blade.

7. The method of claim 4 further comprising:

determining from the width, thickness and density of the sheet, and predetermined length of the filaments the number of revolutions of the rotatable blade needed to produce an amount of filaments to approximately equal the uniform quantity of filaments to be bagged.

8. The method of claim 1 further comprising:

providing a rotatable magazine turret for supporting the plurality of magazines.

9. The method of claim 1 further comprising the steps of:

providing a holding surface disposed around the mold opening for supporting the sheet of material over the mold; and drawing the sheet of material to the holding surface.

10. The method of claim 1 wherein the mold is provided with a plurality of mold portions which are selectively movable between an open position and a closed position.

11. A method for producing and bagging uniform quantities of reduced density filaments of material in a continuous process, the method comprising:

a. providing a continuous sheet of material having a thickness, a width, a reduced density and a predetermined travel speed;

b. providing a plurality of magazines selectively movable between a filament-receiving position and a filament-discharging position;

c. providing at least one mold positioned to communicate with the magazine positioned in the filament-discharging position, the mold having an open first end, a second end and a side wall cooperating to define a mold opening;

d. slitting the continuous sheet of material to produce continuous strands of material having a predetermined width;

e. cutting the continuous strands of material into filaments so as to produce filaments at a predetermined rate;

f. transferring a substantially uniform quantity of filaments continuously into a magazine positioned in the filament-receiving position;

g. moving the magazine filled with the substantially uniform quantity of filaments to the filament-discharging position and another one of the magazines into the filament-receiving position at a rate corresponding to the predetermined rate that the filaments are being produced;

h. positioning a sheet of material capable of being formed into a bag adjacent the mold opening of the mold;

i. drawing the sheet of material into the mold opening of the mold so as to form the sheet of material into a bag;

j. discharging filaments from the magazine filled with the substantially uniform quantity of filaments and positioned in the filament-discharging position so that the substantially uniform quantity of filaments are discharged into the bag;

k. removing the bag containing the substantially uniform quantity of filaments; and l. repeating steps d, e, f, g, h, i, j, k and l.

12. A method for producing and bagging uniform quantities of reduced density filaments of material in a continuous process, the method comprising:

a. providing a continuous sheet of material having a thickness, a width, a reduced density and a predetermined travel speed;

b. providing a plurality of magazines selectively movable between a filament-receiving position and a filament-discharging position;

c. providing a mold positioned to communicate with the magazine positioned in the filament-discharging position, the mold having an open first end, a second end and a side wall cooperating to define a mold opening;

d. slitting the continuous sheet of material to produce continuous strands of material having a predetermined width;

e. passing the continuous strands of material through a cutter comprising a rotatable blade rotating at a predetermined rotational rate corresponding to the travel speed of the continuous sheet of material so that filaments are produced having a predetermined length;

f. determining from the width, thickness and density of the continuous sheet of material, and the predetermined length of the filaments, the number of revolutions of the rotatable blade needed to produce an amount of filaments to approximately equal the uniform quantity of filaments to be bagged;

g. counting the revolutions of the rotatable blade;

h. transferring a substantially uniform quantity of filaments continuously into a magazine positioned in the filament-receiving position;

i. moving the magazine filled with the substantially uniform quantity of filaments to the filament-discharging position and another one of the magazines into the filament-receiving position based on a predetermined number of revolutions of the rotatable blade;

j. positioning a sheet of material capable of being formed into a bag adjacent the mold opening of the mold;

k. drawing the sheet of material into the mold opening of the mold so as to form the sheet of material into a bag;

l. discharging filaments from the magazine filled with the substantially uniform quantity of filaments and positioned in the filament-discharging position so that the substantially uniform quantity of filaments are discharged into the bag;

m. removing the bag containing the substantially uniform quantity of filaments; and n. repeating steps d, e, f, g, h, i, j, k, l, m and n.

13. A method for producing and bagging uniform quantities of reduced density filaments of material in a continuous process, the method comprising:

a. providing a plurality of magazines selectively movable between a filament-receiving position and a filament-discharging position;

b. providing a mold positioned to communicate with a magazine positioned in the filament-discharging position, the mold comprising a plurality of mold portions selectively movable between an open position for releasing a bag formed in the mold and a closed position for forming a sheet of material into a bag, the mold portions cooperating to provide the mold with an open first end, a second end and a side wall cooperating to define a mold opening;

c. moving each of the mold portions into the closed position;

d. producing filaments of material having a reduced density at a predetermined rate;

e. transferring a substantially uniform quantity of filaments continuously into a magazine positioned in the filament-receiving position;

f. moving the magazine filled with the substantially uniform quantity of filaments to the filament-discharging position and another one of the magazines into the filament-receiving position at a rate corresponding to the predetermined rate that the filaments are being produced;

g. positioning a sheet of material adjacent the mold opening formed in the mold;

h. drawing the sheet of material into the mold opening of the mold so as to form the sheet of material into a bag;

i. discharging filaments from the magazine filled with the substantially uniform quantity of filaments and positioned in the filament-discharging position so that the substantially uniform quantity of filaments are discharged into the bag;

j. moving each of the mold portions into the open position thereby releasing the bag containing the substantially uniform quantity of filaments; and k. repeating steps c, d, e, f, g, h, i, j and k.

* * * * *